United States Patent Office 3,758,487
Patented Sept. 11, 1973

---

3,758,487
THIAZOLO(THIONO)-PHOSPHORIC(PHOSPHONIC) ACID ESTERS
Hellmut Hoffman, Wuppertal-Elberfeld, Ingeborg Hammann, Cologne, and Wilhelm Stendel, Wuppertal-Elberfeld, Germany, assignors to Bayer Aktiengesellschaft, Leverkusen, Germany
No Drawing. Filed Dec. 16, 1971, Ser. No. 208,901
Claims priority, application Germany, Dec. 29, 1970,
P 20 64 307.6
Int. Cl. C07d 19/32
U.S. Cl. 260—302 E        8 Claims

ABSTRACT OF THE DISCLOSURE

Thiazolo(thiono)-phosphoric(phosphonic) acid esters of the general formula

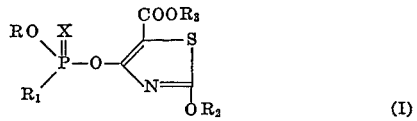

(I)

in which

R, $R_2$ and $R_3$ are alkyl radicals with 1 to 6 carbon atoms,
$R_1$ is an alkyl or alkoxy radical with 1 to 6 carbon atoms, and
X is oxygen or sulfur, which possess activity against acarids, bacteria, fungi, yeasts and insects.

---

The present invention relates to and has for its objects the provision of particular new thiazolo(thiono)-phosphoric(phosphonic) acid esters, i.e. O,O - dialkyl - O-[2-alkoxy-5-carbalkoxythiazol(4)yl]-phosphoric acid esters, their alkanephosphonic acid analogue and the thiono analogues of each, which possess activity against insects, acarids, bacteria, fungi and yeasts, active compositions in the form of mixtures of such compounds with solid and liquid dispersible carrier vehicles, and methods for producing such compounds and for using such compounds in a new way especially for combating pests, e.g. insects, acarids, bacteria, fungi and yeasts especially insects and acarids, with other and further objects becoming apparent from a study of the within specification and accompanying examples.

It is known from German published specification (DAS) 1,193,953 that thiadiazolo(thiono)-phosphoric (phosphonic) acid esters, for example O-ethyl-O-(3-methyl-1,2,4-thiadiazol(5)yl)-methane- (Compound A), O-ethyl-O-(3 - methyl - 1,2,4 - thiadiazol(5)yl)-ethane-thiono- (Compound B) and O-ethyl-O-(3-methyl-1,2,4-thiadiazol(5)yl) - benzenethionophosphonic acid esters (Compound C), possess insecticidal activity.

The present invention provides thiazolo(thiono)-phosphoric(phosphonic) acid esters of the general formula

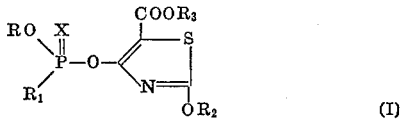

(I)

in which

R, $R_2$ and $R_3$ are alkyl radicals with 1 to 6 carbon atoms,
$R_1$ is an alkyl or alkoxy radical with 1 to 6 carbon atoms, and
X is oxygen or sulfur.

These compounds have been found to exhibit strong insecticidal and acaricidal, properties, as well as certain bactericidal properties.

Surprisingly, the thiazolo(thiono)-phosphoric(phosphonic) acid esters according to the invention are distinguished by a considerably better insecticidal and acaricidal activity, besides an effectiveness against bacteria, mold fungi and yeasts, than the known thiadiazolo-(thiono)-phosphoric(phosphonic) acid esters of similar constitution and the same direction of activity. The compounds according to the invention therefore represent a genuine enrichment of the art.

The invention also provides a process for the production of a thiazolo-(thiono)-phosphoric(phosphonic) acid ester of the Formula I in which a (thiono)-phosphoric (phosphonic) acid ester halide of the general formula

(II)

is reacted with a 2-alkoxy-4-hydroxy-5-carbalkoxy-thiazole of the general formula

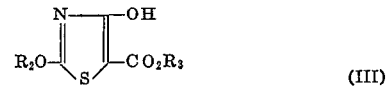

(III)

in the form of an alkali metal salt, alkaline earth metal salt or ammonium salt or in the presence of an acid-binding agent, R, $R_1$, $R_2$, $R_3$ and X having the meanings stated above, and Hal being a halogen atom.

If, for example, O,O-diethyl-phosphoric acid ester chloride and 2-methoxy-5-carbethoxy-4-hydroxy-thiazole are used as starting materials, the reaction course can be represented by the following formula scheme:

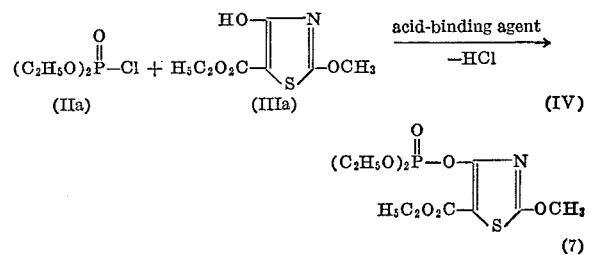

(7)

Preferably, R, $R_2$ and $R_3$ are lower alkyl radicals with 1 to 4 carbon atoms, such as methyl, ethyl, n-propyl, iso-propyl, n-butyl, sec.-butyl, tert.-butyl or isobutyl, while $R_1$ is such a radical or a lower alkoxy radical with 1 to 4 carbon atoms, such as methoxy, ethoxy, n-propoxy, iso-propoxy, n-butoxy, sec.-butoxy, tert.-butoxy or iso-butoxy. Hal is preferably chlorine.

As examples of (thiono)-phosphoric(phosphonic) acid ester halide and 2-alkoxy-4-hydroxy-5-carbalkoxythiazoles to be used in the process, there are mentioned in particular O,O-dimethyl-, O,O-diethyl-, O,O-dipropyl-, O,O-diisopropyl-, O,O-dibutyl-, O,O-di-tert.-butyl, O,O-di - sec. - butyl-, O,O - diisobutyl-, O - methyl-O-ethyl-, O-methyl-O-propyl-, O-methyl-O-isopropyl-, O-methyl-O-n-butyl-, O-methyl-O-tert.-butyl-, O-methyl-O-isobutyl-, O-methyl-O-sec.-butyl-, O-ethyl-O-propyl-, O-ethyl-O-iso-propyl-, O-ethyl-O-n-butyl-, O-ethyl-O-sec.-butyl-, O-ethyl-O-tert.-butyl-, O-ethyl-O-isobutyl, O-propyl-O-n-butyl-, O-propyl-O-sec.-butyl-, O-propyl-O-tert.-butyl-, O-propyl-O-isobutyl-, O-iso-propyl-O-propyl-, O-iso-propyl-O-n-butyl-, O-iso-propyl-O-sec.-butyl-, O-iso-propyl- O-tert.-butyl and O-isopropyl-O-isobutylphosphoric acid ester chlorides and their thiono analogues; further, O-methyl-methane, O-methyl-ethane-, O-methyl-propane-, O-methyl-isopropane-, O-methyl-n-butane-, O-methyl-sec.-butane-, O-methyl-tert.-butane-, O-methyl-isobutane-, O-ethyl-methane-, O-ethyl-ethane-, O-ethyl-isopropane-, O-ethyl-propane-, O-ethyl-n-butane-, O-ethyl-sec.-butane-, O-ethyl-tert.-butane, O-ethyl-isobutane-, O-propyl-methane-, O-propyl-ethane-, O-propyl-propane, O-propyl - isopropane-, O - propyl-n-butane-, O-propyl-sec.-butane-, O-propyl-isobutane-, O-propyl-tert.-butane, O-iso-propyl-methane-, O-iso-propyl-ethane, O-isopropyl-propane-, O - iso-propyl - iso-propane-, O-iso-propyl-n-butane-, O - iso - propyl-sec.-butane-, O-iso-propyl-tert.-butane-, O-butyl- isopropane-, O-butyl-butane-, O-butyl-isobutane-, O-butyl-tert.-butane, O-tert.-butyl-methane-, O-tert.-butyl-ethane, O-tert.-butyl-tert.-butane- and O-tert.-butyl-sec.-butane-phosphonic acid ester chlorides and their thiono analogues; further.

2-methoxy-5-carbomethoxy-, 5-carbethoxy-, 5-carbopropoxy-, -5-carbisopropoxy-, -5-carbobutoxy-, -5-carbo-tert.-butoxy-, -5-carbo-sec.-butoxy-, -5-carb-isobutoxy-4-hydroxythiazole or the corresponding 2-ethoxy-, -propoxy-, -iso-propoxy-, -butoxy-, -sec.-butoxy-, -tert.-butoxy-, and -iso-butoxy derivatives.

The (thiono) - phosphoric(phosphonic) - acid ester halides of the Formula II required as starting materials are described in the literature and available according to known processes.

The thiazole derivatives of the Formula III can be prepared for examples as follows:

Starting from a carbonic acid alkyl ester chloride there is obtained, by reaction with potassium thiocyanate, the intermediate product (a), which is reacted with alkali metal alcoholate to give compound (b) which, in turn, yields with a bromoacetic acid alkyl ester the compound (c) from which, in the presence of an alkali metal alcoholate in an organic solvent, for example an alcohol, the desired thiazole derivative is obtained by cyclization:

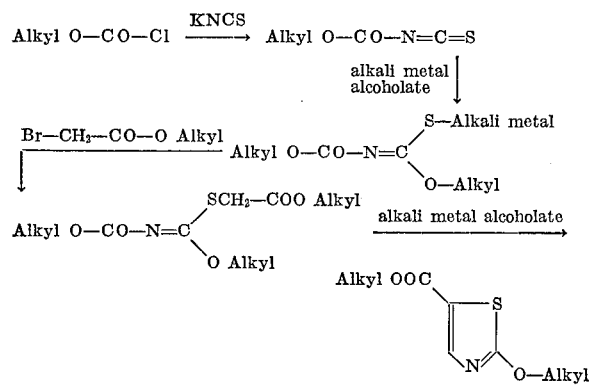

The process according to the invention for the preparation of the thiazolo(thiono)-phosphoric(phosphonic) acid esters is preferably carried out with the use of a suitable solvent which term includes a mere diluent. As such, practically all inert organic solvents are suitable. These include, above all, aliphatic and aromatic optionally chlorinated hydrocarbons, such as benzene, toluene, xylene, benzine, methylene chloride, chloroform, carbon tetrachloride and chlorobenzene; ethers, such as diethyl ether, dibutyl ether and dioxane; ketones, such as acetone, methylethyl ketone, methyl-iso-propyl ketone and methyl-isobutyl ketone; and nitriles, such as acetonitrile and propionitrile.

As acid acceptors, all customary acid-binding agents can be used. Particularly good results have been obtained with alkali metal carbonate and alcoholates, such as sodium and potassium carbonate, methylate or ethylate; and, aliphatic, aromatic or heterocyclic amines, for example triethylamine, dimethylamine, dimethylaniline, dimethylbenzylamine and pyridine.

The reaction temperature can be varied within a fairly wide range. In general, the reaction is carried out at about 0 to 100, preferably about 20 to 50° C.

The reaction is, in general, carried out at normal pressure.

In carrying out the process, the starting materials are in most cases used in equimolar proportion. An excess of one or other of the reaction components brings no substantial advantages. The reaction is preferably carried out in the presence of one of the abovementioned solvents, as well as in the presence of an acid acceptor, at the temperatures stated, and the reaction mixture, after several hours' stirring—optionally with heating—may be worked up in the usual manner.

The substances according to the invention are obtained in most cases in the form of colorless to slightly yellow-colored, viscous, water-insoluble oils which cannot be distilled without decomposition but can, by so-called "slight distillation," i.e. by prolonged heating at moderately elevated temperatures under reduced pressure, be freed from the last volatile components and in this way can be purified. The refractive index is particularly useful for their characterization.

As already mentioned, the new thiazolo(thiono)-phosphoric(phosphonic) acid esters are distinguished by an outstanding insecticidal and acaricidal effectiveness against plant pests, hygiene pests and pests of stored products. They possess a good activity against both sucking and biting insects. At the same time, they exhibit a low phytotoxicity. In some cases, they exhibit an effectiveness against bacteria, mold fungi and yeasts.

The compounds according to the invention can be used with success as pesticides in crop protection and the protection of stored products, as well as in the hygiene field.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the rosy apple aphid (*Sappaphis mali*), the mealy plum aphid (*Hvaloptrus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanopetera), such as *Hercinothrips fermoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicades, such as *Euscelis bilobatus* and *Nephotettix bipuctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia küniella*) and greater wax moth (*Galleria mellonella*); and the like.

Also to be classed with the biting insects contemplated herein are beetles (Coleoptera), for example the granary weevil (*Sitophilus granarius-Calandra granaria*), the Colorado beetle (*Leptinotarsa decemlineata*), the dock beetle (*Gastrophysa viridula*), the mustard beetle (*Phea-

*don cochleariae*), the blossom beetle (*Meligethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Recticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetarnychus urticate*) and the European red mite (*Parateranychus pilosus-Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*) finally, ticks, such as the relapsing fever tick (*Ornithodorus moubata*) and the like.

When applied against hygiene pests and pests of stored products, particularly flies and mosquitoes, the compounds of the invention are also distinguished by an outstanding residual activity on wood and clay, as well as a good stability to alkali on limed substrates.

In the veterinary medical field, the compounds of the invention can be used with success against numerous injurious animal parasites, such as insects.

As ectoparasites from the class of the insects contemplated herein there are mentioned: Mallophaga, as for example the cattle biting louse (*Damalinea bovis*), Diptera, as for example the sheep ked (*Melophagus ovinus*) and Diptera larvae parasitizing in warm-blooded animals, as for example *Lucilia sericata, Lucilia cuprina, Chrysomya chloropaga* (strains normally sensitive to, and strains resistant to, phosphoric acid esters) and larvae of warble flies (*Hypoderma bovis*); and the like.

Application in the veterinary field can take place in known manner, such as by oral application in the form of for example tablets, capsules, draughts or granulates, by dermal application in the form of for example dipping (dips), spraying (sprays), pouring-on and dusting over and by parenteral application in the form of injection, for example.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents, (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents especially plant protection agents, such as other insecticides, acaricides, rodenticides and fungicides, or bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi, bacteria and yeasts, and more particularly methods of combating at least one of insects and acarids, which comprises applying to at least one of correspondingly, (a) such insects, (b) such acarids, (c) such fungi, (d) such bacteria, (e) such yeasts, and (f) the corresponding habitat thereof, i.e. the locus to be protected, a correspondingly combative or toxic amount, i.e. an insecticidally, acaricidally, fungicidally, bactericidally or yeasticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

The 2-alkoxy-4-hydroxy-5-carbalkoxy-thiazoles required as starting materials can be prepared for example as follows:

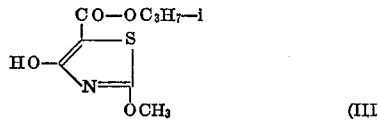

(IIIb)

To 132 g. (0.5 mole) of the compound of the following formula

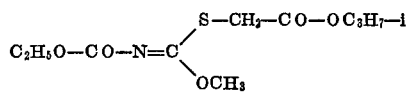

To 132 g. (0.5 mole) of the compound of the following formula in 1500 ml. of isopropanol there are added 0.5 mole of potassium isopropylate; a thick slurry forms, which is stirred overnight. The precipitate is then filtered off with suction, dried in clay and stirred for a longer period with 500 ml. of water and 500 ml. of ether. Subsequently, 0.5 mole of glacial acetic acid is added to the mixture, the phases are separated and the organic layer is dried. After the solvent has been drawn off, the residue is slightly distilled. There are obtained 79 g. (73% of theory) of the desired 2-methoxy-4-hydroxy-5-carbisopropoxy-thiazole of the melting point 44–45° C.

The following starting materials may be obtained analogously:

TABLE 1

| Formula | Melting point or refractive index | Yield (percent of theory) |
|---|---|---|
| HO—[thiazole]—CO—OC$_3$H$_7$-i, S, OC$_2$H$_5$ | M.P.: 65° C. | 78 |
| HO—[thiazole]—CO—OC$_3$H$_5$, S, OC$_2$H$_5$ | M.P.: 68–71° C. | 51 |
| HO—[thiazole]—CO—OC$_2$H$_5$, S, OCH$_3$ | M.P.: 69–64° C. | 54 |
| HO—[thiazole]—CO—OC$_2$H$_5$, S, OC$_3$H$_7$-i | M.P.: 69–70° C. | 14 |
| HO—[thiazole]—CO—OC$_3$H$_7$-i, S, OC$_3$H$_7$-i | $n_D^{23}$: 1.4993 | 80 |

EXAMPLE 2

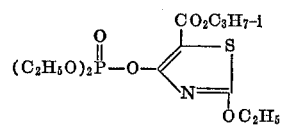

(1)

To 46 g. (0.2 mole) of 2-ethoxy-4-hydroxy-5-carbisopropoxythiazole produced in Example 1 in 200 ml. of acetonitrile and 21 g. of triethylamine there are added 35 g. (0.2 mole) of O,O-diethylphosphoric acid ester chloride, the reaction temperature rising to 48° C. After 4 hours' stirring, the mixture is poured into water and taken up with benzene and the organic phase is washed until there is a neutral reaction and dried, the solvent is drawn off and the residue is slightly distilled; 57 g. (78% of theory) of O,O-diethyl-O-[2-ethoxy-5-carb-isopropoxy-thiazol(4)yl]-phosphoric acid ester are obtained as an oil with the refractive index $n_D^{20}$: 1.4832.

The following compounds can be prepared in analogous manner:

TABLE 2

| Formula | Refractive index | Yield (percent of theory) |
|---|---|---|
| (2) (C$_2$H$_5$O)$_2$P(S)—O—[thiazole]—CO—OC$_3$H$_7$-i, S, OCH$_3$ | $n_D^{23}$: 1.5073 | 82 |
| (3) (C$_2$H$_5$)(C$_2$H$_5$O)P(S)—O—[thiazole]—CO—OC$_3$H$_7$-i, S, OC$_2$H$_5$ | $n_D^{23}$: 1.5172 | 76 |

TABLE 2—Continued

| Formula | Refractive index | Yield (percent of theory) |
|---|---|---|
| (4) (C$_2$H$_5$O)$_2$P(=O)—O—[ring with CO—OC$_2$H$_5$, S, N, OC$_2$H$_5$] | $n_D^{23}$: 1.4881 | 77 |
| (5) (C$_2$H$_5$O)$_2$P(=S)—O—[ring with CO—OC$_2$H$_5$, S, N, OC$_2$H$_5$] | $n_D^{23}$: 1.5097 | 60 |
| (6) C$_2$H$_5$, C$_2$H$_5$O—P(=S)—O—[ring with CO—OC$_2$H$_5$, S, N, OC$_2$H$_5$] | $n_D^{23}$: 1.5242 | 77 |
| (7) (C$_2$H$_5$O)$_2$P(=S)—O—[ring with CO—OC$_2$H$_5$, S, N, OCH$_3$] | $n_D^{23}$: 1.5205 | 59 |
| (8) C$_2$H$_5$, C$_2$H$_5$O—P(=S)—O—[ring with CO—OC$_2$H$_5$, S, N, OC$_3$H$_7$-i] | $n_D^{22}$: 1.5175 | 82 |
| (9) C$_2$H$_5$, C$_2$H$_5$O—P(=S)—O—[ring with CO—OC$_3$H$_7$-i, S, N, OC$_3$H$_7$-i] | $n_D^{22}$: 1.5082 | 85 |
| (10) (C$_2$H$_5$O)$_2$P(=S)—O—[ring with CO—OC$_3$H$_7$-i, S, N, OC$_2$H$_5$] | $n_D^{20}$: 1.5043 | 71 |
| (11) CH$_3$, i-C$_3$H$_7$O—P(=S)—O—[ring with CO—OC$_3$H$_7$-i, S, N, OC$_2$H$_7$] | $n_D^{20}$: 1.5111 | 78 |

The following examples illustrate the activity of the novel compounds set forth hereinabove:

EXAMPLE 3

Drosophila test

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier, and the concentrate is diluted with water to the desired concentration.

1 cc. of the preparation of the active compound is applied with a pipette to a filter paper disc of 7 cm. diameter. The wet disc is placed in a glass vessel containing 50 vinegar flies (*Drosophila melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from Table 3:

TABLE 3
(Drosophila test)

| Active compound | Concentration of active compound in percent | Degree of destruction in percent after 1 day |
|---|---|---|
| (A) CH$_3$, C$_2$H$_5$O—P(=O)—O—[ring with S, N, CH$_3$] (known) | 0.1 / 0.01 | 100 / 0 |
| (7) (C$_2$H$_5$O)$_2$P(=S)—O—[ring with COOC$_2$H$_5$, S, N, OCH$_3$] | 0.1 / 0.01 | 100 / 100 |
| (5) (C$_2$H$_5$O)$_2$P(=S)—O—[ring with COOC$_2$H$_5$, S, N, OC$_2$H$_5$] | 0.1 / 0.01 / 0.001 | 100 / 100 / 80 |
| (6) C$_2$H$_5$O, C$_2$H$_5$—P(=S)—O—[ring with COOC$_2$H$_5$, S, N, OC$_2$H$_5$] | 0.1 / 0.01 / 0.001 | 100 / 100 / 90 |
| (8) C$_2$H$_5$O, C$_2$H$_5$—P(=S)—O—[ring with COOC$_2$H$_5$, S, N, OC$_3$H$_7$-i] | 0.1 / 0.01 | 100 / 100 |
| (2) (C$_2$H$_5$O)$_2$P(=S)—O—[ring with COOC$_3$H$_7$-i, S, N, OCH$_3$] | 0.1 / 0.01 / 0.001 | 0 / 10 / 100 / 75 |
| (10) (C$_2$H$_5$O)$_2$P(=S)—O—[ring with COOC$_3$H$_7$-i, S, N, OC$_2$H$_5$] | 0.1 / 0.01 / 0.001 | 100 / 100 / 45 |
| (3) C$_2$H$_5$O, C$_2$H$_5$—P(=S)—O—[ring with COOC$_3$H$_7$-i, S, N, OC$_2$H$_5$] | 0.1 / 0.01 | 100 / 100 |
| (11) CH$_3$, i-C$_3$H$_7$O—P(=S)—O—[ring with COOC$_3$H$_7$-i, S, N, OC$_2$H$_5$] | 0.1 / 0.01 | 100 / 100 |
| (9) C$_2$H$_5$O, C$_2$H$_5$—P(=S)—O—[ring with COOC$_3$H$_7$-i, S, N, OC$_3$H$_7$-i] | 0.1 / 0.01 | 100 / 100 |

EXAMPLE 4

Plutella test

Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed where as 0% means that none of the caterpillars are killed.

The active compounds, the concentrations of the active compounds, the evaluation time and the results can be seen from the following Table 4:

TABLE 4
(Plutella test)

| Active compound | | Concentration of active compound in percent | Degree of destruction in percent after 3 days |
|---|---|---|---|
| (B) |  (known) | 0.1<br>0.01 | 100<br>0 |
| (C) | 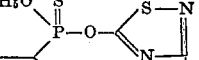 (known) | 0.1<br>0.01 | 100<br>0 |
| (5) |  | 0.1<br>0.01 | 100<br>90 |
| (4) | 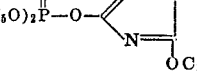 | 0.1<br>0.01 | 100<br>75 |
| (6) | 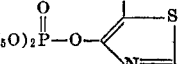 | 0.1<br>0.01 | 100<br>80 |
| (8) | 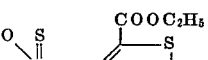 | 0.1<br>0.01 | 100<br>100 |
| (1) |  | 0.1<br>0.01 | 100<br>70 |
| (10) | 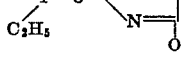 | 0.1<br>0.01 | 100<br>85 |
| (3) | 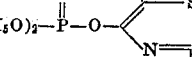 | 0.1<br>0.01<br>0.001 | 100<br>100<br>50 |
| (11) | 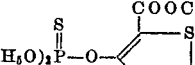 | 0.1<br>0.01<br>0.001 | 100<br>100<br>85 |

TABLE 4—Continued

| Active compound | | Concentration of active compound in percent | Degree of destruction in percent after 3 days |
|---|---|---|---|
| (9) | $C_2H_5O\;S\;\;\;\;\;COOC_3H_7\text{-}i$ <br> $\quad\;\diagdown\|\quad\quad\;\;/\!=\!\!\!=\!\!\!S$ <br> $\quad\quad P\!-\!O\!-\!\Big\langle\quad\quad$ <br> $\;/\quad\quad\quad\quad\;\;\;\;N\!=\!\!=\!$ <br> $C_2H_5\quad\quad\quad\quad\quad\quad OC_3H_7\text{-}i$ | 0.1<br>0.01<br>0.001 | 100<br>100<br>85 |

EXAMPLE 5

Myzus test (contact action)

Solvent: 3 parts by weight acetone
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 5:

TABLE 5
(Myzus test)

| Active compound | Concentration of active compound in percent | Degree of destruction in percent after 1 day |
|---|---|---|
| $CH_3\;S$ ... (known) | 0.1<br>0.01 | 100<br>0 |
| (A) $CH_3\;O$ ... (known) | 0.1<br>0.01 | 100<br>0 |
| (B) $C_2H_5\;S$ ... (known) | 0.1<br>0.01 | 100<br>0 |
| (C) $C_2H_5O\;S$ ... (known) | 0.1 | 0 |
| (2) $(C_2H_5O)_2P(S)$-O- ... $COOC_2H_5$ / $OCH_3$ | 0.1<br>0.01 | 100<br>90 |
| (4) $(C_2H_5O)_2P(S)$-O- ... $COOC_2H_5$ / $OCH_3$ | 0.1<br>0.01 | 100<br>95 |

TABLE 5—Continued

| Active compound | Concentration of active compound in percent | Degree of destruction in percent after 1 day |
|---|---|---|
| (6) $C_2H_5O$–P(S)($C_2H_5$)–O–[2-$OC_2H_5$-5-$COOC_2H_5$-thiazol-4-yl] | 0.1 / 0.01 / 0.001 | 100 / 100 / 80 |
| (8) $C_2H_5O$–P(S)($C_2H_5$)–O–[2-$OC_3H_7$-i-5-$COOC_2H_5$-thiazol-4-yl] | 0.1 / 0.01 | 100 / 99 |
| (10) $(C_2H_5O)_2$P(O)–O–[2-$OC_2H_5$-5-$COOC_3H_7$-i-thiazol-4-yl] | 0.1 / 0.01 | 100 / 85 |
| (3) $C_2H_5O$–P(S)($C_2H_5$)–O–[2-$OC_2H_5$-5-$COOC_3H_7$-i-thiazol-4-yl] | 0.1 / 0.01 | 100 / 95 |
| (11) $CH_3$–P(S)(i-$C_3H_7O$)–O–[2-$OC_2H_5$-5-$COOC_3H_7$-i-thiazol-4-yl] | 0.1 / 0.01 | 100 / 100 |

EXAMPLE 6

Test with parasitizing fly larvae

Solvent: 35 parts by weight ethyleneglycolmonomethyl ether.

Emulsifier: 35 parts by weight nonylphenolpolyglycol ether.

To produce a suitable preparation of active compound, 30 parts by weight of the active substance concerned is mixed with the stated amount of solvent which contains the above mentioned proportion of emulsifier, and the concentrate so obtained is diluted with water to the desired concentration.

About 20 fly larvae (Lucilia cuprina) are put into a test-tube which contains about 2 cc. of horse musculature. 0.5 ml. of the preparation of active compound are applied to this horseflesh. After 24 hours, the degree of destruction is determined as a percentage. 100% means that all, 0% that no, larvae have been killed.

The active compound tested, the concentration applied and the test results obtained can be seen from Table 6.

TABLE 6

Test with parasitizing fly larvae

| Active compound | Concentration of active compound in p.p.m. | Degree of destruction in percent (Lucilia cuprina) |
|---|---|---|
| (6) $C_2H_5O$–P(S)($C_2H_5$)–O–[2-$OC_2H_5$-5-$CO$–$OC_2H_5$-thiazol-4-yl] | 300 / 30 / 3 | 100 / 100 / <50 |
| (5) $(C_2H_5O)_2$P(S)–O–[2-$OC_2H_5$-5-$CO$–$OC_2H_5$-thiazol-4-yl] | 300 / 100 / 30 / 10 / 3 | 100 / 100 / 100 / 100 / 0 |
| (4) $(C_2H_5O)_2$P(O)–O–[2-$OC_2H_5$-5-$CO$–$OC_2H_5$-thiazol-4-yl] | 300 / 30 / 3 | 100 / 100 / 0 |
| (3) $C_2H_5$–P(S)($H_5C_2O$)–O–[2-$OC_2H_5$-5-$CO$–$OC_3H_7$i-thiazol-4-yl] | 300 / 100 / 30 / 10 / 3 / 1 | 100 / 100 / 100 / 100 / 100 / 100 |
| (1) $(C_2H_5O)_2$P(O)–O–[2-$OC_2H_5$-5-$CO$–$OC_3H_7$-thiazol-4-yl] | 300 / 30 / 3 | 100 / 100 / 50 |
| (11) $CH_3$–P(S)(i$C_3H_7O$)–O–[2-$OC_2H_5$-5-$CO$–$OC_3H_7$-i-thiazol-4-yl] | 300 / 30 / 3 | 100 / 100 / 0 |
| (10) $(C_2H_5O)_2$P(S)–O–[2-$OC_2H_5$-5-$CO$–$C_3H_7$-i-thiazol-4-yl] | 300 / 100 / 30 / 10 / 3 / 1 | 100 / 100 / 100 / 100 / 100 / >50 |
| (9) $C_2H_5O$–P(S)($H_5C_2$)–O–[2-$OC_3H_7$i-5-$CO$–$OC_3H_7$-i-thiazol-4-yl] | 300 / 30 / 3 | 100 / 100 / 0 |
| (3) $(C_2H_5O)_2$P(S)–O–[2-$OCH_3$-5-$CO$–$OC_3H_7$-i-thiazol-4-yl] | 300 / 30 / 3 | 100 / 100 / 0 |

It will be appreciated that the instant specification and examples are set forth by way of illustration and not limitation, and that various modifications and changes may be made without departing from the spirit and scope of the present invention.

What is claimed is:

1. Thiazolo(thiono) - phosphoric(phosphonic) acid esters of the general formula

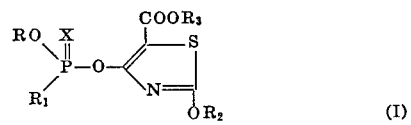

(I)

in which

R, $R_2$ and $R_3$ are alkyl radicals with 1 to 6 carbon atoms, $R_1$ is an alkyl or alkoxy radical with 1 to 6 carbon atoms, and X is oxygen or sulfur.

2. Compounds according to claim 1 in which R, $R_1$, $R_2$ and $R_3$ each have 1 to 4 carbon atoms.

3. The compound according to claim 1 wherein such compound is O-ethyl-O-[2-ethoxy-5-carbisopropoxythiazol(4)yl]-ethanethionophosphonic acid ester of the formula

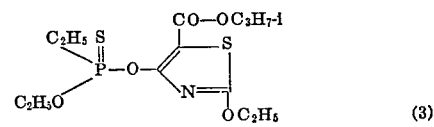

(3)

4. The compound according to claim 1 wherein such compound is O-ethyl-O-[2-ethoxy-5-carbethoxythiazol(4)yl]-ethanethionophosphonic acid ester of the formula

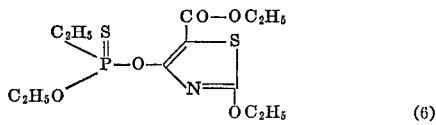 (6)

5. The compound according to claim 1 wherein such compound is O-ethyl-O-[2-isopropoxy-5-carbethoxythiazol(4)yl]-ethanethionophosphonic acid ester of the formula

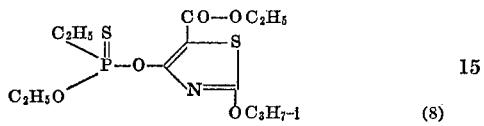 (8)

6. The compound according to claim 1 wherein such compound is O-ethyl-O-[2-isopropoxy-5 - carbisopropoxy-thiazol(4)yl]-ethanethionophosphonic acid ester of the formula

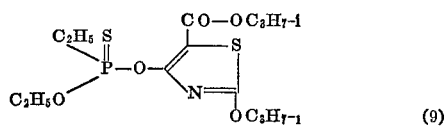 (9)

7. The compound according to claim 1 wherein such compound is O,O-diethyl-O-[2-ethoxy-5-carbisopropoxy-thiazol(4)yl]-thionophosphoric acid ester of the formula

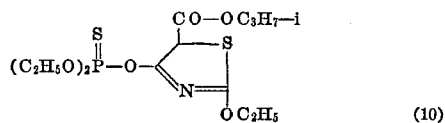 (10)

8. The compound according to claim 1 wherein such compound is O-isopropoxy-O-[2-ethoxy-5-carbisopropoxy-thiazol(4)yl]-methanethionophosphonic acid ester of the formula

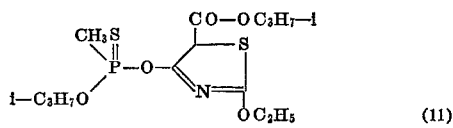 (11)

References Cited
UNITED STATES PATENTS
3,687,963   8/1972   Hoffmann et al. ___ 260—302 E ALEX MAZEL, Primary Examiner
R. J. GALLAGHER, Assistant Examiner U.S. Cl. X.R.
260— 302 R, 534 S; 424—270

UNITED STATES PATENT OFFICE
CERTIFICATE OF CORRECTION

Patent No. 3,758,487     Dated September 11, 1973

Inventor(s) Hellmut Hoffman et al.     Page 1 of 2

It is certified that error appears in the above-identified patent and that said Letters Patent are hereby corrected as shown below:

Col. 2, line 2, after "acaricidal" cancel comma ",".

Col. 3, last unit of the structural formulae, change to read as follows:

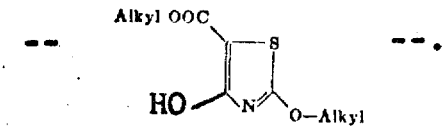

Col. 3, line 73, change "carbonate" to --carbonates--.

Col. 4, line 44, correct spelling of "Hyalopterus".

line 75, correct spelling of "Phae-".

Col. 5, line 37, correct spelling of "Tetranychus";

line 38, correct spelling of "Paratetranychus".

Col. 7, lines 62 and 63, cancel "To 132 g.(0.5 mole) of the compound of the following formula".

Col. 8, Table 1, under heading of "Melting point or refractive index", for the third compound, change "69" to -- 60 --.

UNITED STATES PATENT OFFICE
CERTIFICATE OF CORRECTION

Patent No. 3,758,487                  Dated

Inventor(s)

It is certified that error appears in the above-identified patent and that said Letters Patent are hereby corrected as shown below:

Col. 9, Table 2, Compound (9), change "CO-OC$_3$H-i" to

-- CO-OC$_3$H$_7$-i --.

Col. 10, Table 3, Compound (2), under the heading "Degree of destruction in percent after 1 day" change "10$^0$" to -- 100 --.

Col. 12, Table 5, Compound (4), cancel "$(C_2H_5O)_2 \overset{S}{\underset{\|}{P}}-$" and substitute therefor -- $(C_2H_5O)_2 \overset{O}{\underset{\|}{P}}-$ --.

Signed and sealed this 8th day of October 1974.

(SEAL)
Attest:

McCOY M. GIBSON JR.
Attesting Officer

C. MARSHALL DANN
Commissioner of Patents